United States Patent [19]
Allingham

[11] Patent Number: 5,270,102
[45] Date of Patent: Dec. 14, 1993

[54] PLASTIC SHEETING PREVENTING WATER DROPLET FORMATION ON ITS SURFACE

[76] Inventor: Yael Allingham, 8 Shoshana Street, Benyamina, Israel

[21] Appl. No.: 898,720

[22] Filed: Jun. 15, 1992

[30] Foreign Application Priority Data

Jun. 13, 1991 [IL] Israel .................................. 98486

[51] Int. Cl.$^5$ ................................ B32B 7/02
[52] U.S. Cl. .................... 428/215; 428/36.6; 428/500; 428/516; 428/520
[58] Field of Search ............ 428/500, 36.6, 516, 428/215

[56] References Cited

FOREIGN PATENT DOCUMENTS 6046750 9/1979 Japan .................................. 428/36.6
7162731 10/1982 Japan .

Primary Examiner—Edith Buffalow
Attorney, Agent, or Firm—Keck, Mahin & Cate

[57] ABSTRACT

A polymer sheet for use in agricultural structures, like greenhouses, tunnels and the like, which prevents fog formation on its surface, resulting in an essentially continuous water film upon water vapor deposition. The polymeric sheet can be one of polymeric ethylene-vinyl alcohol or of a copolymer of ethylene vinyl alcohol coextruded with a polyolefin. Multilayer sheets are very effective, such as ethylene vinyl alcohol/ethylene vinyl acetate/polyethylene three-layer sheet. Copolymers which do not impair the specific fog-formation preventing property of ethylene vinyl alcohol (EVOH) can be used.

The invention also relates to agricultural structures which comprise such plastic sheets.

8 Claims, No Drawings

PLASTIC SHEETING PREVENTING WATER DROPLET FORMATION ON ITS SURFACE

FIELD OF THE INVENTION

There are provided polymeric sheets which prevent formation of water droplets on their surface, when water vapor condenses on such surfaces. Such fog formation is of great importance in agricultural structures, such as greenhouses, tunnels and the like, as dripping of water-droplets on growing plants is apt to harm these, and as plastic sheets covered with water droplets (fog) greatly hinder the entry of sunlight into such agricultural structures. The sheets are used so that the anti-fogging surface faces inwards, so when water vapor condenses on such sheets, it forms a film and not discrete droplets. The sheets of the invention are characterized by that this effect lasts for long periods of time.

An excellent material for forming hydrophilic surface sheets of the invention is ethylene vinyl alcohol (EVOH) polymers. Multiple layer sheets, with one outer surface having the EVOH properties are part of the invention.

BACKGROUND OF THE INVENTION

Most plastic sheetings are hydrophobic, thus facilitating water condensation on their surface in the form of discrete droplets. Also water droplets impinging on such films do not spread out on the surface but retain the droplet shape.

When used as cover for greenhouses condensation of water vapor and droplet formation takes place on the inner surface of such sheetings, i.e. facing the interior of the greenhouse. After growth to a certain size, such drops become detached from the surface and fall onto growing plants, causing frequently damage to sensitive crops, such as flowers and also to leaves of plants. The presence of fogging thus deposited on the surface of leaves constitutes a focus for fungal spore germination which cause grave damage, such as, for example, *Botrytis cinerea*. Furthermore, fogging on the plastic sheet surface reduces light entering the greenhouse, frequently by as much as about 50 percent, This reduces photosynthesis during some hours, until heating clears up the droplets from the film surface. There have been tried sprays applied to such plastic sheeting, in order to reduce droplet formation on the film surface. Such sprays retain their effectivity only for relatively short periods of time and require frequent repetition.

During recent years there have been attempts to incorporate antifogging agents into the compositions from which agricultural plastic sheetings are produced. Such additives are generally of such structure that they have an olefinic part which is compatible with the olefinic matrix, while the other end of the molecule is of hydrophilic or polar nature, incompatible with the matrix, which is thus caused to protrude at the surface of the sheeting. When water condenses on such sheetings, it will form, through hydrogen bonding, a water film which is spread over the surface and the water will flow to the ground. A variety of such additives is known, but most of these retain their activity over not more than two or three seasons, depending on the climate and on the other components of the film. It is not possible to produce thin-gauge films containing such additives, as they tend to "slip-out" during manufacture. It is one of the objects of the invention to provide films or sheetings which retain their properties over a prolonged period of time, of the order of up to four years. There are known films having a thin EVOH (ethylene-vinyl-alcohol) layer, but this is sandwiched between two layers of polyethylene or the like, i.e. as bonding agent. Fogging is especially disturbing on the inner surfaces of polymeric sheets covering greenhouses or other agricultural structures. The droplets of water hinder the entrance of light into the greenhouse, and may reduce such entry by up to about 50 percent.

When fogging is prevented, and any water deposit forms a continuous film, this phenomenon is prevented, and there are obtained better and healthier crops. In the early morning hours the surface of the polymer sheets is the coldest surface in the greenhouse, and thus water deposits on such surfaces. This occurs generally up to about 10 o'clock in the morning. Droplets which form at the outside are generally not harmful as they evaporate rather quickly.

Experiments have shown that when fog deposition on such polymeric surfaces at the interior of agricultural structures is prevented, enhanced crops of flowers, vegetables and fruit are obtained.

SUMMARY OF THE INVENTION

According to the invention, there are provided thin coextruded polymer films or sheetings, for various uses, and especially in agriculture. They are characterized by having at least one outer surface having a hydrophilic nature, thus preventing droplet formation thereon. Hydrophilic ethylene vinyl alcohol based polymers have the required characteristics. Multilayer films, comprising one outer EVOH layer can be produced by coextrusion, but the production of wide films (of the order of 10 to 16 meters) is practically impossible by film lamination. According to the invention there are provided multi-layer films, generally of two or three layers, where one of the outer layers is a hydrophilic one which imparts to the resulting multi-layer sheet the desired hydrophilic characteristics. Generally such films can be produced with an outer thin EVOH layer, of a gauge as low as about 20 to 40 microns.

Contrary to the films of the present invention, films disclosed in the prior art comprise an EVOH layer as intermediate layer, so that its "antifogging" properties are not expressed at all. In such films, EVOH is used mainly as heat insulator. Amongst patents dealing with EVOH intermediate layers there may be mentioned JP 61227045, 90049909 and 2155734.

The films and sheetings of the present invention comprise at least one exterior EVOH layer, imparting to it antifogging properties. For example, self supporting films of the order of about 30 to 70 microns EVOH monolayers may be used for low growing crops, such as strawberries and melons, cultivated in low tunnels. According to a preferred embodiment, multilayer sheets are used, with at least one exterior EVOH film, which is generally in the 30 to 50 micron range, the other layers being of conventional polymers used for the production of agricultural sheetings.

Suitable materials are various polyolefins, such as polyethylene or ethylene vinyl acetate, etc. A material of choice is low density polyethylene (LDPE) which advantageously contains an IR absorber such as that supplied by Constab (Germany) under the name Constab IR0404, while both layers are stabilized against UV by substances of the type like Cosntab UV 1006Ld.

According to yet another embodiment of the invention there is produced a triple layer film, with EVOH as one exterior film, LDPE as the second exterior film, with an intermediate layer of a copolymer EVA, ethylene vinyl acetate, with about 18% vinyl acetate, which serves as IR absorber. When also a UV absorber of the benzophenone type is incorporated, films lasting for up to about four years under outdoor use, are obtained.

All these mono- and multilayered films are stabilized required for greenhouse films.

The invention is illustrated by way of example only with reference to the examples, which are to be construed in a non-limitative manner.

EXAMPLE 1: Single Layer Sheet

A sheet of 50 microns thickness was extruded, the material used being Clarene R20, which is an ethylene vinyl alcohol copolymer which contains 2 percent by weight of "Admer" additive, produced by Solvay Company. The sheet has excellent hydrophilic surface properties and prevents fog formation on its surface.

Example 2: Double Layer Sheet

A double layer sheet was extruded, with layers of:

| | |
|---|---|
| Low density polyethylene (PE): | 8.5 kg |
| Constab IR 0404 Ld | 1.2 kg |
| Constab UV 1006 Ld | 0.3 kg |

This material was extruded to form a film of 120 microns, while the second, coextruded sheet of 160 microns thickness, of good mechanical properties. The outer surface of the Example 1 sheet had the required hydrophilic properties.

EXAMPLE 3: Triple Layer Sheet

| | |
|---|---|
| First sheet: | a 40 micron sheet of Example 1; |
| Second layer: | a 40 micron sheet of ethylene vinyl acetate (EVA) copolymer of 18 percent VA, containing 9 percent Constab UV 1006 Ld; |

The third, exterior sheet: a 100 micron sheet of polyethylene stabilized with 3 percent Constab UV 1006 Ld. The overall thickness of the coextruded triple-layer sheet was 180 microns. It has excellent mechanical properties, and a highly effective outer hydrophilic surface.

EXAMPLE 4: Triple Layer Sheet

A triple layer sheet was coextruded, with the layers being:

| | |
|---|---|
| Selar OH BX 228 | 30 microns |
| Bynel E 331 (binder) | 20 microns |
| Polyethylene (LDPE) | 150 microns |

The outer surface of the Selar layer had excellent hydrophilic properties, which lasted for a long period of time.

Various tests were carried out with polymer sheets of the present invention, characterized by at least one exterior surface of EVOH polymer. These were tested under various conditions as to the efficacy as antifogging protection. The tests were carried out as recommended by the "Atmer" antifogging agent-manufacturer: Solvay Company, and the films of the invention were compared with various commercially available agricultural films. The sheets with the exterior EVOH surface were very effective as antifogging films, and remained free of droplet formation over prolonged periods of time. They retained this property long after commercially available films had lost any antifogging property they had at the start of the tests.

Various field tests were carried out with polymer sheets according to the various examples. An agricultural tunnel of about 50 meter length was covered with alternating strips of commercially available films, and with strips of films according to the invention. The experiment was started in October, and in the tunnel tomatoes were planted. The antifogging property of commercial films deteriorated gradually, and practically ceased to exist by the end of the winter. The films with an EVOH surface facing the interior of the tunnel remained free of water droplets to the end of the growing season, and were used again in the following season.

The invention included films where not only EVOH, but also mixtures of this with other compatible polymers, or copolymers thereof with other polymers which retain the hydrophilic property, are used. As long as these have a pronounced hydrophilic surface, which results in the spread of water on the surface of a film, without formation of discrete drops, these are to be considered as part of the invention.

The invention also comprises a method of cultivation of crops in agricultural structures, which have a cover on at least one exterior surface of such structure, where the crops are cultivated in structures having films with at least one interior surface of an EVOH or EVOH-containing polymer.

I claim:

1. An extruded polymer sheet, resistant to water droplet formation at its surface upon water vapor condensation, consisting essentially of ethylene vinyl alcohol (EVOH) polymer.

2. An extruded composite polymer sheet, resistant to water droplet formation at its surface upon water vapor condensation, wherein an EVOH sheet is coextruded as an outer layer with one or more further coextruded polymer sheets providing mechanical strength.

3. A coextruded composite polymer sheet according to claim 2, where one of the layers is a polyalkylene selected from the group consisting of polyethylene and polypropylene.

4. A polymer sheet according to claim 1, where the sheet contains one or more additives selected from the group consisting of TR absorbers, UV absorbers and antioxidants.

5. A polymer sheet according to claim 2, where a first layer is an EVOH layer, a middle layer is an ethylene vinyl acetate layer and a third layer is a polyolefin layer.

6. A polymer sheet according to claim 1 having a thickness of from 20 microns up to 100 microns.

7. A composite sheet according to claim 2, having a thickness of from 40 to about 180 microns.

8. An agricultural structure for growing plants inside said structure, having a covering comprising a polymer sheet according to claim 2, with the EVOH layer facing towards the interior of the structure.

* * * * *